US008180715B2

(12) United States Patent
Forman

(10) Patent No.: US 8,180,715 B2
(45) Date of Patent: May 15, 2012

(54) SYSTEMS AND METHODS FOR COLLABORATIVE FILTERING USING COLLABORATIVE INDUCTIVE TRANSFER

(75) Inventor: George Forman, Port Orchard, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 738 days.

(21) Appl. No.: 12/332,930

(22) Filed: Dec. 11, 2008

(65) Prior Publication Data

US 2010/0153314 A1 Jun. 17, 2010

(51) Int. Cl.
*G06F 15/18* (2006.01)
(52) U.S. Cl. ........................................................ 706/12
(58) Field of Classification Search ........................ None
See application file for complete search history.

(56) References Cited

U.S. PATENT DOCUMENTS

| 5,884,282 | A  | * | 3/1999  | Robinson ................... | 705/7.33 |
| 6,839,680 | B1 |   | 1/2005  | Liu et al.                  |          |
| 7,882,006 | B2 | * | 2/2011  | Gardner et al. ...........   | 705/36 R |
| 2002/0161664 | A1 | * | 10/2002 | Shaya et al. .................. | 705/26 |
| 2003/0101449 | A1 |   | 5/2003  | Bentolila et al.            |          |
| 2008/0126176 | A1 |   | 5/2008  | Iguchi                      |          |

OTHER PUBLICATIONS

Sarwar et al, "Item-Based Collaborative Filtering Recommendation Algorithms", 2001, Proceedings of the 10th international conference on World Wide Web, 285-295.*
Melville et al, "Content-Boosted Collaborative Filtering for Improved Recommendations", Jul. 2002, Proceedings of the Eighteenth National Conference on Artifical Intelligence, p. 187-192.*
Fenstermacher et al.; "Mining Client-Side Activity for Personalization" Department of Management Information Systems, Eller College of Business and Public Administration, University of Arizona, Jun. 2002.
Baoyao, Zhou; "Intelligent Web Usage Mining" Nanyang Technological University, Division of Information Systems, School of Computer Engineering, 2004.
Baynote Inc.: The Collective Intelligence Platform, Online, http://www.baynote.com/technology/platform/ 2010.
Hottolink Inc.; "Recognize" Online, http://www.hottolink.co.jp/english/reconize.html, 2009.
Hongjun Lu et al: "Extending a Web Browser with Client-Side Mining," Hong Kong University of Science and TechnologyDepartment of Computer Science, Clear Water Bay, Kowloon, Hong Kong, China, 2003.
Shankar et al.; "Personalized Web Search Based on Client Side Ontology", CS 498: B.Tech Project, 10. IIT Kanpur, India 2010.
Sendhikumar et al.; "Personalized ontology for web search personalization" 1. Anna University, Chennai, India , 2008.

(Continued)

*Primary Examiner* — David R Vincent
*Assistant Examiner* — Paulinho E Smith

(57) ABSTRACT

A database includes a list of members of a first group, a list of members of a second group, and ratings for at least some of the members of the second group. The database is accessed. The ratings are attributed to the members of the first group. A machine learning training set is built for a particular member of the first group. The training set includes class labels corresponding to the particular member's ratings for the members of the second group, and features that include supplied and predicted ratings from at least a subset of processed members of the first group. A predictor for the particular member of the first group is trained based on the machine learning training set. The predictor corresponding to the particular member is used to generate predicted ratings for one or more members of the second group the particular member has not rated.

15 Claims, 3 Drawing Sheets

OTHER PUBLICATIONS

Shahabi et al.; "Yoda an Accurate and Scalable Web based Recommendation System?" University of Southern California, Los Angeles, Sep. 2001.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; "A Framework for Efficient and Anonymous Web Usage Mining Based on Client-Side Tracking", 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

* cited by examiner

| | Database | | | | | | | | | 114 |
|---|---|---|---|---|---|---|---|---|---|---|
| | User | | | | | | | | | |
| Movie | U1 | U2 | U3 | U4 | U5 | U6 | U7 | U8 | ... | Un |
| A | 5 | | | | | 4 | 4 | 1 | | |
| B | 2 | 5 | | | | | | | | |
| C | 3 | 5 | | | 4 | | | | | |
| D | | | | | | | | 5 | | |
| E | 5 | | 5 | 2 | | 5 | 5 | 1 | | |
| F | 5 | | 5 | | | 5 | 4 | | | |
| G | 5 | | 5 | | | 5 | | 1 | | |
| H | | | | | | | | 1 | | |
| I | | | | | | | | 5 | | |
| J | | | | | 3 | | | | | |
| K | | 1 | | | | | | | | |
| L | | | | 3 | | | 2 | 1 | | |
| M | 4 | | | | | | | | | |
| N | | | | | | 3 | 5 | | | |
| O | | 4 | | 3 | | | | | | |
| P | | | | | | 3 | | 5 | | |
| Q | 4 | | | | | | 3 | | | |
| R | | | 2 | | | | | 1 | | |
| S | | 3 | | | 3 | | | 1 | | |
| T | | | | | | | | 5 | | |

FIG. 2B

| Movie | U1 | U2 | U3 | U4 | U5 | U6 | U7 | U8 | ... | Un |
|---|---|---|---|---|---|---|---|---|---|---|
| A | 5 | P2 | | | | 4 | 4 | 1 | | |
| B | 2 | 5 | | | | | | | | |
| C | 3 | 5 | | | 4 | | | | | |
| D | P2 | P3 | | | | | | | | |
| E | 5 | P4 | 5 | 2 | | | | 5 | | |
| F | 5 | P1 | 5 | | | 5 | 5 | 1 | | |
| G | 5 | P1 | 5 | | | 5 | 4 | | | |
| H | P2 | P3 | | | | | | 1 | | |
| I | P4 | P2 | | 3 | 3 | | | 5 | | |
| J | P5 | P4 | | | | | | | | |
| K | P1 | 1 | | | | | 2 | 1 | | |
| L | P3 | P3 | | | | | 5 | | | |
| M | 4 | P1 | | | | 3 | | | | |
| N | P2 | P2 | | | 3 | | | | | |
| O | P2 | 4 | | | | 3 | 3 | 5 | | |
| P | P4 | P3 | | | | | | | | |
| Q | 4 | P5 | | | | | | | | |
| R | P5 | P5 | 2 | | 3 | | 3 | 1 | | |
| S | P1 | 3 | | | | | | 1 | | |
| T | P3 | P4 | | | | | | 5 | | |

FIG. 2C

| Movie | U1 | U2 | U3 | U4 | U5 | U6 | U7 | U8 | ... | Un |
|---|---|---|---|---|---|---|---|---|---|---|
| A | 5 | P2 | P3 | P3 | P2 | 4 | 4 | 1 | | 4 |
| B | 2 | 5 | P2 | P3 | P3 | P3 | P2 | P5 | | |
| C | 3 | 5 | P5 | P5 | 4 | P4 | P1 | P5 | | 2 |
| D | P2 | P3 | P1 | P4 | P1 | P3 | P3 | 5 | | 3 |
| E | 5 | P4 | 5 | 2 | P5 | 5 | 5 | 1 | | |
| F | 5 | P1 | 5 | P1 | P4 | 5 | 4 | P1 | | 4 |
| G | 5 | P1 | 5 | P5 | P4 | 5 | P2 | 1 | | |
| H | P2 | P3 | P4 | P2 | P1 | P3 | P3 | 5 | | 1 |
| I | P4 | P2 | P5 | P3 | P5 | P1 | P5 | P1 | | |
| J | P5 | P4 | P3 | P5 | 3 | P3 | P1 | P5 | | 5 |
| K | P1 | 1 | P3 | P4 | P1 | P1 | P2 | 1 | | |
| L | P3 | P3 | P5 | 3 | P2 | P2 | 2 | P2 | | 3 |
| M | 4 | P1 | P2 | P3 | P4 | P4 | P3 | P4 | | |
| N | P2 | P3 | P4 | P2 | P4 | 3 | 5 | P3 | | 4 |
| O | P2 | 4 | P5 | P4 | 3 | P3 | P3 | 5 | | |
| P | P4 | P3 | P5 | P3 | P5 | P2 | P5 | P1 | | |
| Q | 4 | P5 | 2 | P5 | P3 | 3 | 3 | 1 | | |
| R | P5 | P5 | P2 | P4 | P2 | P5 | P5 | P2 | | 4 |
| S | P1 | 3 | P4 | P1 | 3 | P4 | P1 | 1 | | |
| T | P3 | P4 | P1 | P5 | P3 | P5 | P3 | 5 | | 1 |

SYSTEMS AND METHODS FOR COLLABORATIVE FILTERING USING COLLABORATIVE INDUCTIVE TRANSFER

BACKGROUND

Collaborative filtering systems are used to produce personalized recommendations for a user based on the recorded preferences of other users. One drawback with existing collaborative filtering systems is the difficulty with collecting a large enough sample of preferences of others to provide an accurate recommendation.

BRIEF DESCRIPTION OF THE DRAWINGS

Embodiments of the invention relating to both structure and method of operation may best be understood by referring to the following description and accompanying drawings.

FIG. 2B shows the database of FIG. 1 including an embodiment of a machine learning training set for a member of the first group.

FIG. 2C shows the database of FIG. 1 including an embodiment of a machine learning training set for another member of the first group.

DETAILED DESCRIPTION

Figures 1, 2A:
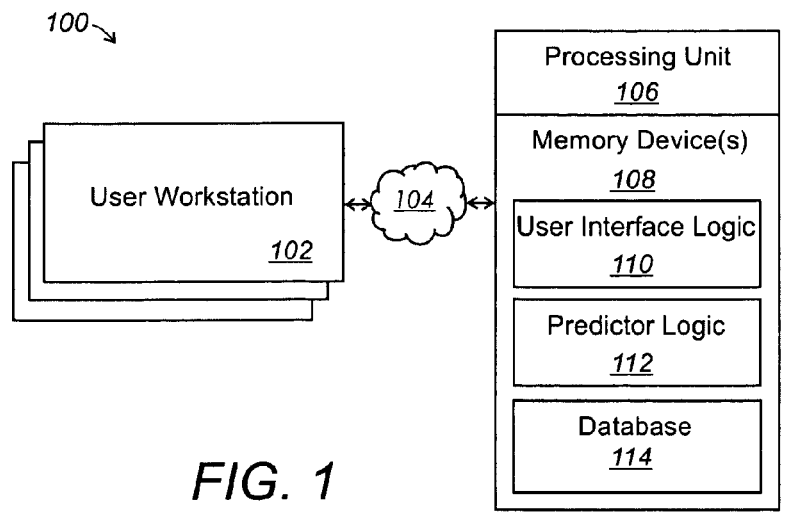
FIG. 1 is a schematic block diagram illustrating an embodiment of a system for collaborative filtering using collaborative inductive transfer.
FIG. 2A shows an embodiment of a portion of the database of FIG. 1 including a table with a list of members of a first group, a list of members of a second group, and ratings for at least some of the members of the second group.

Referring to FIG. 1, an embodiment of a system 100 for collaborative filtering using collaborative inductive transfer is shown. The embodiment of system 100 shown includes one or more user workstations 102 coupled through network 104 to communicate with processing unit 106. Processing unit 106 can be configured with or can remotely access user interface logic 110, predictor logic 112, and database 114. For example, database 114 can be implemented in a remote data server (not shown) and accessed by processing unit 106 via network 104. Some or all of user interface logic 110 can be implemented in user workstations 102 instead of or in addition to processing unit 106.

The term "collaborative filtering" includes attempting to identify for one or more members of a first group, potentially interesting members of a second group by leveraging aggregated input about the affinity or preference between individual members of the two groups. Note that the terms "members of a first group" and "members of a second group" are used to refer in general to any suitable entities, such as users and items, users and forums, states and candidates, companies and suppliers, countries and products, etc. Ratings for members of the second group can be supplied or predicted by members of the first group, and vice versa. In typical embodiments, the first group will be defined as a set of people, customers or users of a system, while the second group will be defined as items or products available from a company. In some embodiments the second group is defined narrowly as movie titles for rent, or books for sale. Thus, recommending movies that a user may like based on the recorded movie-preference ratings of that user and of other users is an example of a collaborative filtering task. In other embodiments, the second group is defined as new articles available for reading; in still other embodiments, the second group is defined as a retail product. These are examples; no restriction on the meaning of the groups is implied. Furthermore, in some embodiments, the meaning of the two groups is swapped: for example, the first group could be boat models and the second group could be potential customers, in which case the task is to identify for each boat model some particular customers to whom marketing literature will be sent, based on recorded rating data of many boat-customer pairs.

It is typical for a member of a first group to supply ratings for some, but not all, members of a second group, such as a list of movies or books. In order to more accurately identify members of the second group of potential interest to a particular member of the first group, system 100 includes predictor logic 112 that trains a predictor for each member of the first group based on predictors that were previously trained for other member of the first group. The predictor logic 112 generates ratings for the members of the second group that have not been supplied by the member of the first group. The predicted ratings are based on actual or predicted ratings of the member of the second group by other members of the first group.

Predictor logic 112 can implement supervised machine learning methods for either classification or regression, depending on which is needed for the type of data being used. Classification is used for binary or nominal ratings; machine learning algorithms such as Naïve Bayes, Support Vector Machine (SVM), or other suitable algorithms are appropriate for use. For numerical ratings, regression models such as Linear Regression, Additive Regression, SVM regression, or other suitable regression models are used. Using training sets that are built for each member of the first and/or second groups, any appropriate supervised machine learning algorithm can be applied to induce or train a predictor for each member. The predictor corresponding to a particular member is used to generate the predicted ratings for members of the second group that the particular member has not rated.

Referring to FIG. 2A, some embodiments of database 114 include a table 200 with a list of members of a first group 202, a list of members of a second group 204, and ratings 206 for at least some of the members of the second group 204. Other suitable data structures can be used in addition to or instead of a table. Additionally, other information that can be used to predict ratings can also be included in table 200. For example, for movies, information such as actors, director, producer, studio, and release date, among others can be included. The members of the first and second groups 202, 204 can be any number of suitable items, entities, and/or people. In the example shown, members of the first group 202 are "Users," including U1 through Un. Members of the second group 204 are a list of twenty (20) "Movies" denoted by the letters A-T. The entries in table 200 include any ratings 206 a user has provided for some movies. Note that the ratings may be supplied by someone or something other than the user. Note also that the users typically do not rate all of the movies, yet it is useful under some circumstances to predict how a user would rate a particular movie, for example, when presenting suggestions for other movies a subscriber to an online movie rental service might enjoy. The systems and methods described herein predict ratings that have not been supplied by a user based on ratings the user has provided for other movies, the ratings other users have provided for the movies, as well as predicted ratings of movies for the other users. Table 200 may include information for any number of members of the first and second groups 202, 204.

FIG. 2B shows an embodiment of another portion of database 114 (FIG. 1) including a machine learning training set 220 for the third member of the first group 202 denoted by "U3". Training set 220 is highlighted by a dashed box around the features 222 of users U1 and U2 and the ratings supplied by user U3. The ratings supplied by or associated with user U3 are referred to as class labels. In general, a particular member's training set 220 includes the ratings for the members of the second group 204 that the particular member of the first group 202 has supplied, along with features 222 with user-supplied and predicted ratings from at least a subset of members of the first group (shown as U1 and U2) that were previously processed by predictor logic 112 (FIG. 1). The predictor logic 112 is trained for U3 using the features 222 in U3's training set 220, and then the trained predictor logic 112 is used to predict ratings for U3 using the features 222 for each item that U3 has not given a rating for; these predictions are stored in the database 114 in the column U3. As an example, suppose U3's preferences are very similar to the first user U1 and quite opposite the second user U2. The machine learning algorithm will learn from the training set 220 to leverage the inputs U1 and U2 appropriately to make predictions for U3, consistent with U1. If, on the other hand, U3's given ratings are consistently one point less than user U1 and are uncorrelated with user U2, then the machine learning algorithm would ideally learn to output the value of input U1 minus one. Both existing and future machine learning algorithms can be brought to bear on collaborative filtering problems by the systems and method disclosed herein.

Another technique for improving the predicted ratings is to append the features with additional information about the item for content-based prediction. As an example, if the domain is movie ratings, then the additional features can represent a bag of words (and/or phrases) found in the title or description of the movie, the movie's actors/directors, etc.

Note that training sets 220 can include a designator that allows the ratings supplied by the members to be identified or distinguished from the predicted ratings. For example, the predicted ratings in training set 220 include the letter "P", whereas the supplied ratings do not. Any other suitable identifiers or designations can be used to distinguish the predicted ratings from the supplied ratings. The identifiers can be used to indicate whether ratings were predicted or supplied by the members when information is presented to the members, as well as other suitable uses. Additionally, ratings supplied by members can replace previously predicted ratings in the training sets 220.

Note that the training set 220 for the first member processed by predictor logic 112 includes no features from previous users to build a predictor. A predictor trained on such a training set 220 will resort to outputting a constant, such as the mean or majority value of the training set. Next, when training for the second member, the first member's constant predictor is used as an input feature except where the first member has supplied ratings. Thus, the predictions for the initial users are likely to be extremely poor quality, but as the predictor logic 112 iterates over many hundreds of users, the quality of its predictions for later users improve. To help bootstrap the induction process for the initial members, the features can be appended with a large set of features that contain random numbers. While random numbers are not predictive in truth, with so many such features and a limited number of rows of training data, the machine learning algorithm will likely find some columns somewhat predictive. Thus, the random variation will produce some variation in the final predictor.

Still another way to help vary the induction process for the initial member includes adding a random perturbation to the output of the initial predictors. The predictors are not particularly accurate for the initial members so although random numbers effectively add error to the output, random perturbation breaks the cycle of predicting constants.

In some embodiments, the members of the first group can be sorted and processed in order of decreasing number of supplied ratings to improve the accuracy of the predictors more quickly. That is, a greater number of supplied ratings in the features is likely to generate accurate predictors more rapidly than sparse data.

In still further embodiments, to predict a given member's rating for an item i, the output of the corresponding predictive model Pu is generated using the associated feature, which are all user-supplied ratings or computable predicted ratings by the induction. The predicted values depend on the outputs of many predictive models for previous members. The predicted values for the particular member of the first group can be computed each time the particular member of the first group's ratings are required, or the member's ratings array can be filled out completely on each iteration so that any given input feature value is pre-computed and can be retrieved from a computer storage device as required. Predictor logic 112 could recommend those items that are predicted to have the highest ratings for collaborative filtering.

Referring to FIG. 2C, an embodiment of a training set 224 in database 114 for another member of the first group 202 designated Un (the nth Member) is shown with a dashed box around features for U1 up to Un, and the supplied ratings for Un. As more members are processed, the training sets will typically include more features. The number of features in a training set 220 can be limited to a number that is likely to provide accurate results while reducing the computational burden. For example, in a database 114 with thousands of users and movies, the training sets 220 may be limited to a few hundred features for each user in order to save computational resources. Then many processors in parallel can train predictors for the remaining members, re-using the matrix of actual and predicted ratings for the subset of members. For example, the first 1000 users would be processed sequentially, one after another, and then the remaining users could be computed in parallel by many processing units 106, each leveraging the set of 1000 users initially processed. In another embodiment, each processing unit 106 may use the most recently processed 1000 users; i.e. the particular users that are used as features may differ for each processing unit 106.

Once a sufficient number of members have been processed, predictor logic 112 can re-build the training sets and regenerate the predictors for a selected number of the members of the first group initially processed. The re-built predictors leverage more input features than the first iteration through for the initial members since the features for the re-built predictors come from the most recently processed members.

In some situations, the number of ratings per member of the second group is much greater than the number of ratings per member of the first group. Predictor logic 112 can build the training sets and predict ratings for the members of the second group in addition to the ratings of the members of the first group, and combine the ratings of the members of the first and second groups to produce composite ratings for the final output. For example, the two predicted ratings can be averaged to produce the composite ratings.

In other embodiments of predictor logic 112 where the members are sorted in order of decreasing number of supplied ratings, the training sets are effectively sorted so the members of the second group with the most number of ratings appear in the first rows, and the members of the first group with the most ratings are in the initial columns. The ratings from the predictors for the members of the second group may be used as the final output nearly everywhere except for the initial members of the first group who supplied so many ratings that their predictors are deemed more accurate than the predictors based on the members of the second group. For example, the predictors for the members of the first group can be used when the predictors for the members of the first group have better accuracy (as judged by root mean square error (RMSE) via known-manner machine learning validation methods) than the predictors for the members of the second group. Note that predictions for many of the members of the first group outside the initial columns would likely never need to be computed since the predictors for the members of the second group can be used instead.

In still other embodiments of predictor logic 112, the underlying machine learning procedure may optionally include feature selection. If some features are regularly not selected over many iterations, then they can be omitted from the training set altogether for future iterations, potentially saving computation and storage.

Figure 3:
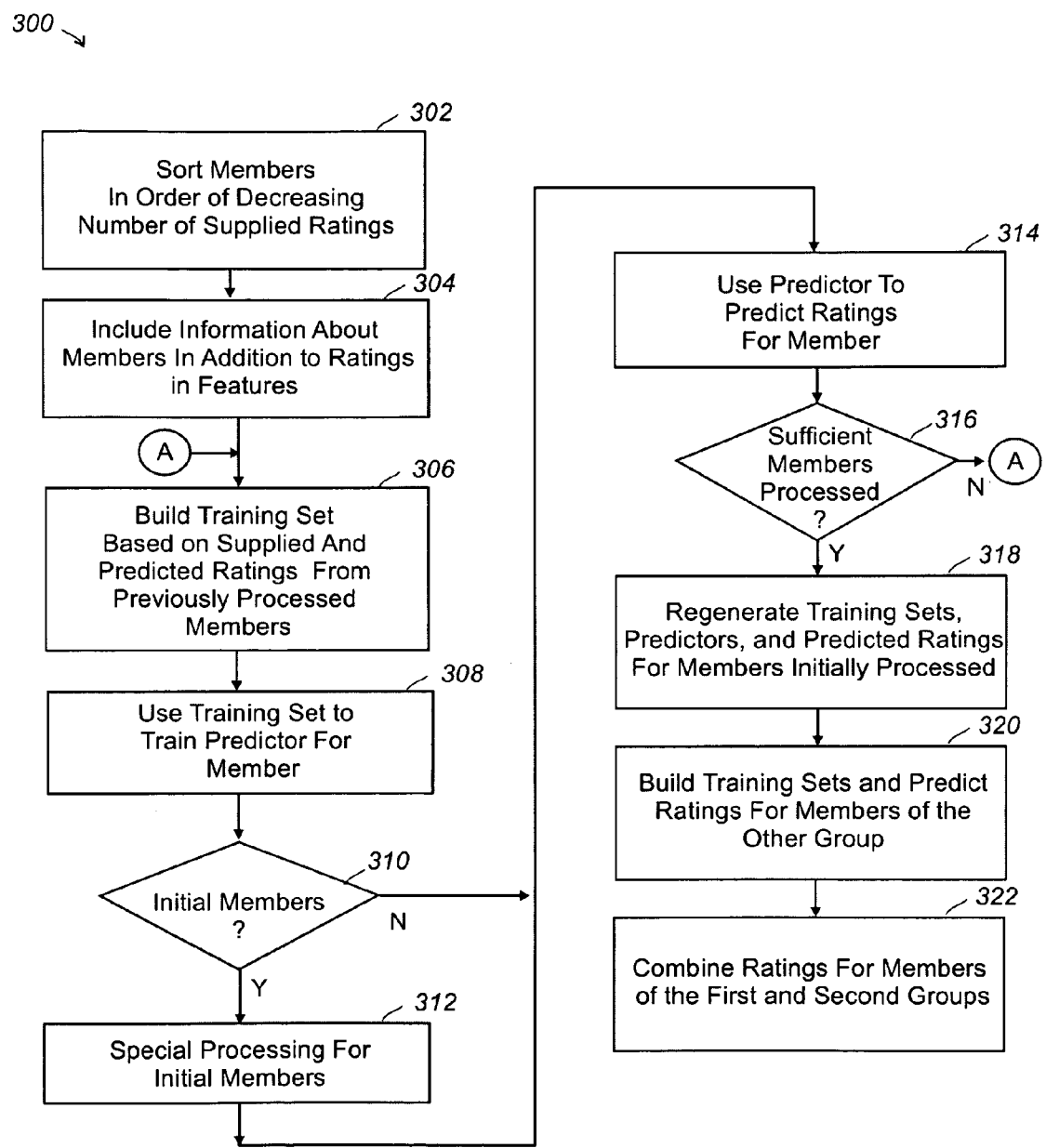
FIG. 3 is a flow diagram of an embodiment of a method for collaborative filtering using collaborative inductive transfer that can be implemented in the system of FIG. 1.

Referring now to FIG. 3, a flow diagram of an embodiment of a method for collaborative filtering 300 is shown that can be implemented in predictor logic 112 of the system of FIG. 1. Process 302 can include sorting members of a first group in order of decreasing number of supplied ratings of members of a second group, and/or vice versa, depending on whether ratings are being predicted for members of the first and second groups, members of the first group, or members of the second group.

Process 304 can include appending the features with additional information about the item for content-based prediction. As an example, if the domain is movie ratings, then the additional features can represent a bag of words (and/or phrases) found in the title or description of the movie, the movie's actors/directors, etc.

Process 306 can include building a training set for a particular member of the first group that includes the ratings for the members of the second group that the particular member has supplied, along with features of supplied and predicted ratings from members that were previously processed.

Process 308 can include using the training set generated by process 306 to train a predictor for the member being processed. Process 308 can implement supervised machine learning methods for classification or regression, depending on which is needed for the type of data being used, as further described herein.

Process 310 can include determining whether the predictors for a specified number of the initial members being processed have been generated. If the initial members are still being processed, control passes to process 312 to account for the fact that the training set for the first member processed includes no features from previous users to build a predictor. A predictor trained on such a training set will output a constant, such as the mean or majority value of the training set. When training for the second member, the first member's constant predictor is used as an input feature except where the first member has supplied ratings. To help the induction process, process 312 may include special processing for the initial users, such as varying the output of the initial predictor(s). For example, the features can be appended with a set of features that contain random numbers. While random numbers are not predictive in truth, with so many such features and a limited number of rows of training data, the machine learning algorithm will likely find some columns somewhat predictive. Another way to help vary the induction process for the initial member includes adding a random perturbation to the output of the initial predictors. Note that a combination of random numbers, random perturbation, and/or other suitable techniques for varying the output of the initial predictor(s) can be used in process 312 in addition to or instead of the foregoing techniques.

Process 314 can include using the predictor trained in process 308 or 312 to predict ratings for members of the second group the particular member has not rated. In some embodiments, when the members are sorted in order of decreasing number of supplied ratings, the training sets are effectively sorted so the members of the second group with the most number of ratings appear in the first rows, and the members of the first group with the most ratings are in the initial columns. The ratings from the predictors based on the members of the second group may be used nearly everywhere except for the first few members of the first group who supplied so many ratings that their predictors are deemed more accurate than the predictors based on the members of the second group, as further described herein.

Process 316 can include determining whether a sufficient number of members have been processed. For example, process 316 can determine whether the root mean square error (RMSE) of the predictors for the members are improving. Other suitable techniques for determining whether a sufficient number of members have been processed, such as a pre-specified number of members processed, or other statistical techniques for determining accuracy of the predictors can be used. If a sufficient number of members have not been processed, control can return to process 306 to begin processing the next member. If a sufficient number of members have been processed, control can transition to process 318.

Process 318 can include regenerating the training sets, the predictors, and the predicted ratings for a selected number of initial members of the first group for which ratings were predicted. The re-built predictors leverage more input features than the first time through for the initial members since the features for the re-built predictors come from the most recently processed users.

In some situations, the number of ratings per member of the second group is much greater than the number of ratings per member of the first group. Processes 320 and 322 can build the training sets and predict ratings for the members of the second group in addition to the ratings of the members of the first group, and combine the ratings of the members of the first and second groups to produce composite ratings. For example, the two predicted ratings can be averaged to produce the composite ratings.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs and logic instructions can be embodied in a computer-readable storage medium or device for use by or in connection with an instruction execution system, device, component, element, or apparatus, such as a system based on a computer or processor, or other system that can fetch instructions from an instruction memory or storage of any appropriate type.

In FIG. 1, user workstations 102 and processing unit 106 can be any suitable computer-processing device that includes memory for storing and executing logic instructions, and is capable of interfacing with other processing systems via network 104. In some embodiments, workstations 102 and processing unit 106 can also communicate with other external components via network 104. Various input/output devices, such as keyboard and mouse (not shown), can be included to allow users to interact with components internal and external to workstations 102 and processing unit 106. User interface logic 110 can present screen displays or other suitable input mechanism to allow a member of the first group to view, enter, delete, and/or modify ratings for members of the second group. Additionally, predicted ratings for a member of the first group may also be presented to the user via a screen display or other suitable output device. Such features are useful when presenting recommendations to the user or other information that predicts the level of interest a user may have in a particular member of a second group.

Additionally, workstations 102 and processing unit 106 can be embodied in any suitable computing device, and so include servers, personal data assistants (PDAs), telephones with display areas, network appliances, desktops, laptops, or other computing devices. Workstations 102 and processing unit 106 and corresponding logic instructions can be implemented using any suitable combination of hardware, software, and/or firmware, such as microprocessors, Field Programmable Gate Arrays (FPGAs), Application Specific Integrated Circuit (ASICs), or other suitable devices.

Logic instructions executed by workstations 102 and processing unit 106 can be stored on a computer readable storage medium or devices 108, or accessed by workstations 102 and processing unit 106 in the form of electronic signals. Workstations 102 and processing unit 106 can be configured to interface with each other, and to connect to external network 104 via suitable communication links such as any one or combination of T1, ISDN, or cable line, a wireless connection through a cellular or satellite network, or a local data transport system such as Ethernet or token ring over a local area network. Memory device 108 can be implemented using one or more suitable built-in or portable computer memory devices such as dynamic or static random access memory (RAM), read only memory (ROM), cache, flash memory, and memory sticks, among others. Memory device(s) 108 can store data and/or execute user interface logic 110, predictor logic 112, and database 114.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. The illustrative techniques may be used with any suitable data center configuration and with any suitable servers, computers, and devices.

What is claimed is:

1. A system comprising:
   access a database that includes a list of members of a first group, members of a second group, and ratings for at least some of the members of the second group, the ratings are attributed to the members of the first group;
   process the members of the first group in order of decreasing number of supplied ratings
   build a machine learning training set for a particular member of the first group, the training set including:
      class labels corresponding to the particular member's ratings for the members of the second group; and
      features that include supplied and predicted ratings from at least a subset of processed members of the first group;
   train a predictor for the particular member of the first group based on the machine learning training set;
   limiting the training set to a pre-selected number of features for each user; and using a plurality of processors in parallel to train the predictors for remaining members,
   use the predictor corresponding to the particular member to generate predicted ratings for one or more members of the second group the particular member has not rated.

2. The non-transitory computer-readable storage medium of claim 1 further embodying:
   logic instructions configured to build the machine learning training set using a subset of the most recently processed members.

3. The non-transitory computer-readable storage medium of claim 1, wherein the predictor is at least one of a classifier and a regression model.

4. The non-transitory computer-readable storage medium of claim 1, wherein the logic instructions are further configured to:
   re-build the training set and regenerate the predicted ratings for a member of the first group initially processed.

5. The non-transitory computer-readable storage medium of claim 1, wherein the logic instructions are further configured to perform at least one:
   use the predictor for the particular member of the first group each time the particular member of the first group's ratings are required, and
   pre-compute the predicted ratings for the particular member of the first group and retrieve the particular member of the first group's ratings from a computer storage device as required.

6. The non-transitory computer-readable storage medium of claim 1, wherein the logic instructions are further configured to perform at least one of:
   use random numbers in the training set where ratings are not available for one or more of the initial members of the first group, and
   randomly perturb the predicted ratings for one or more of the members of the first group initially processed.

7. The non-transitory computer-readable storage medium of claim 1, wherein the logic instructions are further configured to:

use other information regarding the members of the second group in the training set in addition to the ratings.

8. The non-transitory computer-readable storage medium of claim 1, wherein the logic instructions are further configured to:
build the training sets and predict ratings for the members of the second group in addition to the ratings of the members of the first group and combine the ratings of the members of the first and second groups to produce composite ratings.

9. The non-transitory computer-readable storage medium of claim 1, wherein the logic instructions are further configured to:
use the ratings from the predictors based on the members of the second group unless the members of the first group supplied sufficient ratings that the predictors of those members of the first group are deemed more accurate than the predictors based on the members of the second group.

10. A computer-implemented method for collaborative filtering comprising:
generating a machine learning training set for a member of a first group, the training set is based on other members of the first group's ratings for members of a second group and predictions for the ratings when the ratings have not been supplied by the other members of the first group;
training a predictor for the member of the first group based on the machine learning training set;
using the predictor to generate the ratings for the members of the second group that have not been rated by the member of the first group;
limiting the training set to a pre-selected number of features for each user, and using a plurality of processors in parallel to train the predictors for remaining members.

11. The method of claim 10 further comprising:
processing the members of the first group in order of decreasing number of supplied ratings.

12. The method of claim 10, wherein the predictor is at least one of a classifier and a regression model.

13. The method of claim 10, further comprising:
regenerating the training sets, the predictors, and the predicted ratings for a selected number of initial members of the first group for which ratings were predicted.

14. The method of claim 10, further comprising:
performing at least one of:
using other information regarding the members of the second group in the training set in addition to the ratings,
using random numbers in the training set where ratings are not available for one or more of the initial members of the first group; and
randomly perturbing the predicted ratings for one or more of the initial members of the first group.

15. An apparatus comprising:
means for generating a machine learning training set for a member of the first group, the training set is based on other members of the first group's ratings for the members of the second group and predictions for the ratings when the ratings have not been supplied by the other members of the first group;
means for processing the members of the first group in order of decreasing number of supplied ratings,
means for training a predictor for the user based on the machine learning training set;
means for limiting the training set to a pre-selected number of features for each user; and using a plurality of processors in parallel to train the predictors for remaining members,
means for using the predictor to generate the ratings for members of the second group that have not been rated by the user; and
means for performing at least one of the group consisting of:
using other information regarding the members of the second group in the training set in addition to the ratings,
using random numbers in the training set where ratings are not available for one or more of the initial members of the first group, and
randomly perturbing the predicted ratings for one or more of the initial members of the first group before using the predicted ratings in the training set; and
means for processing the members of the first group in order of decreasing number of supplied ratings.

* * * * *

UNITED STATES PATENT AND TRADEMARK OFFICE
CERTIFICATE OF CORRECTION

PATENT NO. : 8,180,715 B2  Page 1 of 1
APPLICATION NO. : 12/332930
DATED : May 15, 2012
INVENTOR(S) : George Forman It is certified that error appears in the above-identified patent and that said Letters Patent is hereby corrected as shown below:

In column 8, line 49, in Claim 5, delete "one:" and insert -- one of: --, therefor.

In column 9, line 34, in Claim 10, delete "user," and insert -- user; --, therefor.

In column 10, lines 39-41, in Claim 15, delete "set; and means for processing the members of the first group in order of decreasing number of supplied ratings." and insert -- set. --, therefor.

Signed and Sealed this
Eleventh Day of December, 2012

David J. Kappos
*Director of the United States Patent and Trademark Office*